US011130434B2

(12) United States Patent
Ernst

(10) Patent No.: US 11,130,434 B2
(45) Date of Patent: Sep. 28, 2021

(54) TRUNK COOLER

(71) Applicant: Jesse Ernst, Eustis, FL (US)

(72) Inventor: Jesse Ernst, Eustis, FL (US)

( * ) Notice: Subject to any disclaimer, the term of this patent is extended or adjusted under 35 U.S.C. 154(b) by 43 days.

(21) Appl. No.: 16/294,168

(22) Filed: Mar. 6, 2019

(65) Prior Publication Data
US 2020/0282891 A1 Sep. 10, 2020

(51) Int. Cl.
*B60N 3/10* (2006.01)
*B62D 63/04* (2006.01)
*F25D 19/00* (2006.01)

(52) U.S. Cl.
CPC .............. *B60N 3/104* (2013.01); *B60N 3/103* (2013.01); *B62D 63/04* (2013.01); *F25D 19/003* (2013.01); *B60N 3/108* (2013.01); *F25D 2331/804* (2013.01); *F25D 2400/32* (2013.01)

(58) Field of Classification Search
CPC ........ B60N 3/104; B60N 3/103; B60N 3/108; B60N 3/00; F25D 19/003; F25D 2331/804; F25D 2400/32; F25D 3/00; F25D 3/02; F25D 3/06; F25D 3/08; B62D 63/04; B60H 1/00; B60H 1/00507; B60H 1/00592; B60R 5/04; B60P 7/00; B60P 7/06
See application file for complete search history.

(56) References Cited

U.S. PATENT DOCUMENTS

| | | | | |
|---|---|---|---|---|
| 3,394,666 A * | 7/1968 | Pearlman | ................ | A47B 3/10 108/129 |
| 4,904,007 A * | 2/1990 | Woodruff | .............. | E05B 65/102 292/341.15 |
| 4,934,549 A * | 6/1990 | Allen | ...................... | A45C 9/00 190/11 |
| 5,056,878 A * | 10/1991 | Givens | ..................... | E04H 6/42 312/351.3 |
| 5,259,215 A * | 11/1993 | Rocca | .................... | A45C 5/143 280/30 |
| 5,660,310 A * | 8/1997 | LeGrow | .................. | B60R 7/043 224/275 |
| 5,667,115 A * | 9/1997 | Verhaeg | ................. | B60R 7/043 224/275 |
| 5,992,331 A * | 11/1999 | Inoue | .................. | A47B 3/0912 108/132 |
| 6,540,279 B1 * | 4/2003 | Bargiel | ................... | B60R 7/043 296/37.15 |
| 6,832,492 B1 * | 12/2004 | Kunkel | .................... | F25D 3/06 62/458 |
| 7,163,262 B2 * | 1/2007 | Anglin | .................... | A47C 4/04 297/184.15 |
| 7,607,630 B2 * | 10/2009 | Jung | .................... | A45C 13/001 190/18 R |
| 7,677,655 B2 * | 3/2010 | Marsh | ................. | B60N 2/3015 297/129 |

(Continued)

*Primary Examiner* — Emmanuel E Duke
(74) *Attorney, Agent, or Firm* — The Iwashko Law Firm, PLLC; Lev Ivan Gabriel Iwashko

(57) ABSTRACT
A trunk cooler removably connected under a seat of a vehicle, the trunk cooler including a base cooler receptacle to store at least one item therein, a plurality of retractable legs disposed on a bottom surface of the base cooler receptacle to support the base cooler receptacle in response to moving the plurality of retractable legs from being retracted in a first vertical position to at least partially extended in a second vertical position, and a cooling system to inject cold air into an interior portion of the base cooler.

7 Claims, 4 Drawing Sheets

(56) References Cited

U.S. PATENT DOCUMENTS

| | | | | |
|---|---|---|---|---|
| 8,490,551 | B1* | 7/2013 | Wagner | A47B 31/04 |
| | | | | 108/25 |
| 9,421,915 | B2* | 8/2016 | Kalergis | B60N 2/305 |
| 9,950,674 | B1* | 4/2018 | Kalergis | B60N 2/305 |
| 2002/0005649 | A1* | 1/2002 | Hofmann | B60N 2/305 |
| | | | | 296/37.15 |
| 2003/0121277 | A1* | 7/2003 | Simmons | A47F 3/0439 |
| | | | | 62/457.2 |
| 2004/0149791 | A1* | 8/2004 | Tuel, Jr. | B60R 7/043 |
| | | | | 224/275 |
| 2005/0067864 | A1* | 3/2005 | Anglin | A47C 4/04 |
| | | | | 297/217.1 |
| 2005/0279750 | A1* | 12/2005 | Barquist | F16M 13/005 |
| | | | | 220/629 |
| 2006/0181103 | A1* | 8/2006 | Khan | B60R 7/043 |
| | | | | 296/37.14 |
| 2007/0157635 | A1* | 7/2007 | Ford | F25D 3/08 |
| | | | | 62/62 |
| 2010/0270821 | A1* | 10/2010 | Ulita | B60R 5/04 |
| | | | | 296/37.14 |
| 2011/0297714 | A1* | 12/2011 | Freeman | B60R 7/04 |
| | | | | 224/483 |
| 2012/0223494 | A1* | 9/2012 | Greene | B25H 1/12 |
| | | | | 280/29 |
| 2016/0251124 | A1* | 9/2016 | Arnold | B65D 43/162 |
| | | | | 220/324 |
| 2017/0215643 | A1* | 8/2017 | Beach | F25B 21/04 |
| 2017/0343247 | A1* | 11/2017 | Ahmad | A45C 11/20 |
| 2018/0335241 | A1* | 11/2018 | Li | B65D 81/3816 |

\* cited by examiner

TRUNK COOLER

BACKGROUND

1. Field

The present general inventive concept relates generally to a cooler, and more particularly, to a trunk cooler.

2. Description of the Prior Art

Many individuals enjoy being outdoors, whether at picnics, fishing, at the beach, or other similar locations and activities. Additionally, many individuals often choose to carry a cooler in order to keep food and beverages chilled. However, storing the cooler and transporting it back and forth may be troublesome due to limited space in a vehicle to contain it, as well as, the physical strain of carrying it.

Typically, a standard cooler wastes space by taking up more space in the vehicle, such as being placed on a seat.

Therefore, there is a need for a trunk cooler to introduce a modern alternative to both transporting and utilizing a standard cooler.

SUMMARY

The present general inventive concept provides a trunk cooler.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a trunk cooler removably connected under a seat of a vehicle, the trunk cooler including a base cooler receptacle to store at least one item therein, a plurality of retractable legs disposed on a bottom surface of the base cooler receptacle to support the base cooler receptacle in response to moving the plurality of retractable legs from being retracted in a first vertical position to at least partially extended in a second vertical position, and a cooling system to inject cold air into an interior portion of the base cooler.

The base cooler receptacle may include a bottom portion to store the at least one item therein, and a top portion pivotally disposed on a portion of a top edge of the bottom portion to cover the bottom portion in a first position and pivot to at least partially open in a second position.

The trunk cooler may further include a clasp disposed on a portion of an outer surface of the base cooler receptacle to facilitate gripping the base cooler receptacle.

The trunk cooler may further include a plurality of retractable hooks pivotally disposed on a portion of the base cooler receptacle to prevent the trunk cooler from moving while connected to the vehicle.

The trunk cooler may further include a plurality of interior walls removably connected to the interior portion of the base cooler receptacle to create a plurality of compartments, such that any contents within each of the plurality of compartments are prevented from mixing.

The trunk cooler may further include a plurality of embedded grooves disposed within the interior portion to stabilize the plurality of interior walls therein, such that the plurality of interior walls are prevented from moving within the base cooler receptacle.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1A:
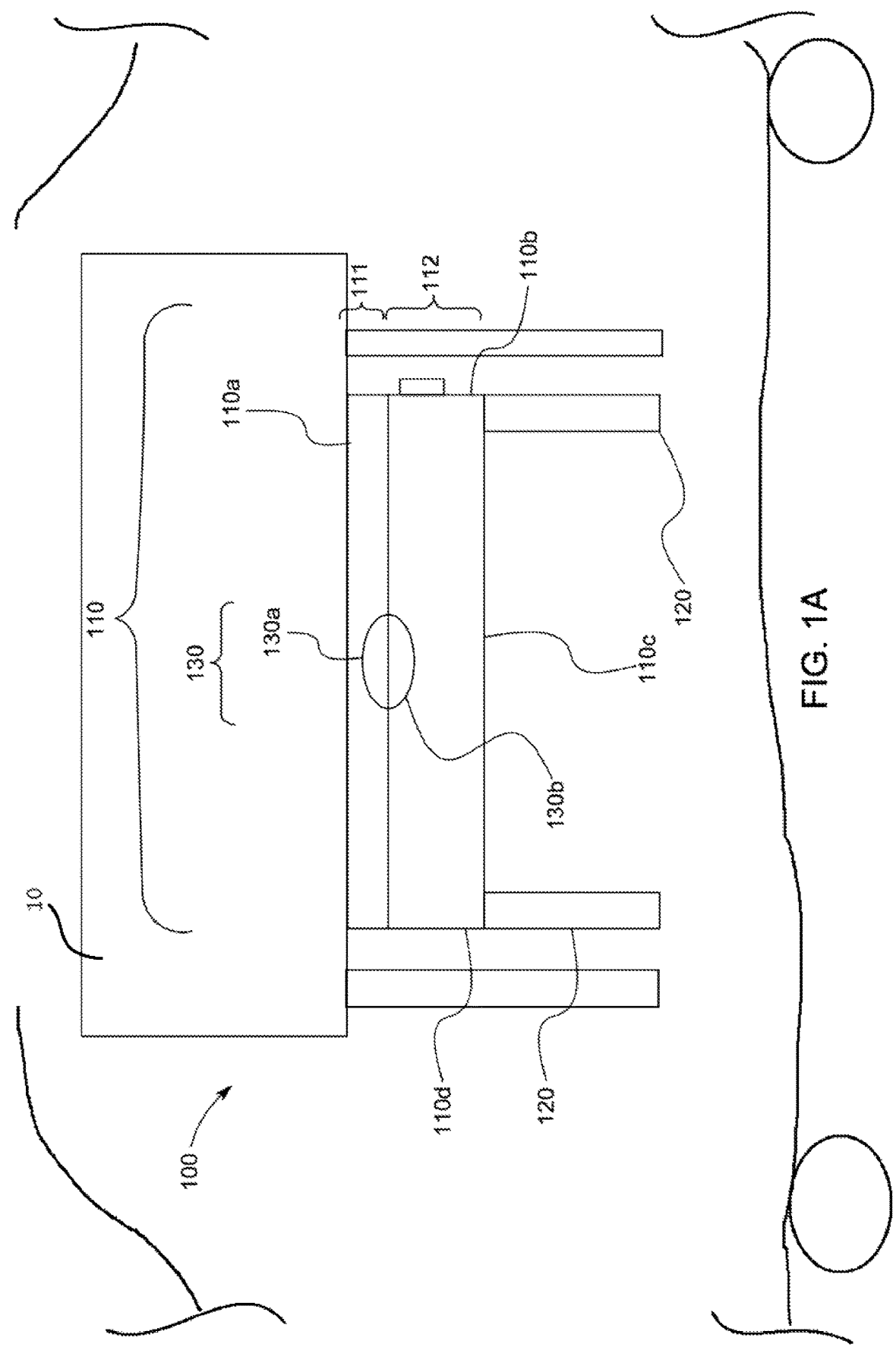
FIG. 1A illustrates a front view of a trunk cooler including a plurality of retractable legs in an extended position and a top portion in a first position, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Trunk Cooler 100
Base Cooler Receptacle 110
First Side 110a
Second Side 110b
Third Side 110c
Fourth Side 110d
Fifth Side 110e
Sixth Side 110f
Top Portion 111
Bottom Portion 112
Plurality of Retractable Legs 120
Clasp 130
First Section 130a
Second Section 130b
Plurality of Retractable Hooks 140
Plurality of Interior Walls 150
Plurality of Embedded Grooves 160
Power Inlet 170
Cooling System 180

FIG. 1A illustrates a front view of a trunk cooler 100 including a plurality of retractable legs 120 in an extended position and a top portion 111 in a first position, according to an exemplary embodiment of the present general inventive concept.

Figure 1B:
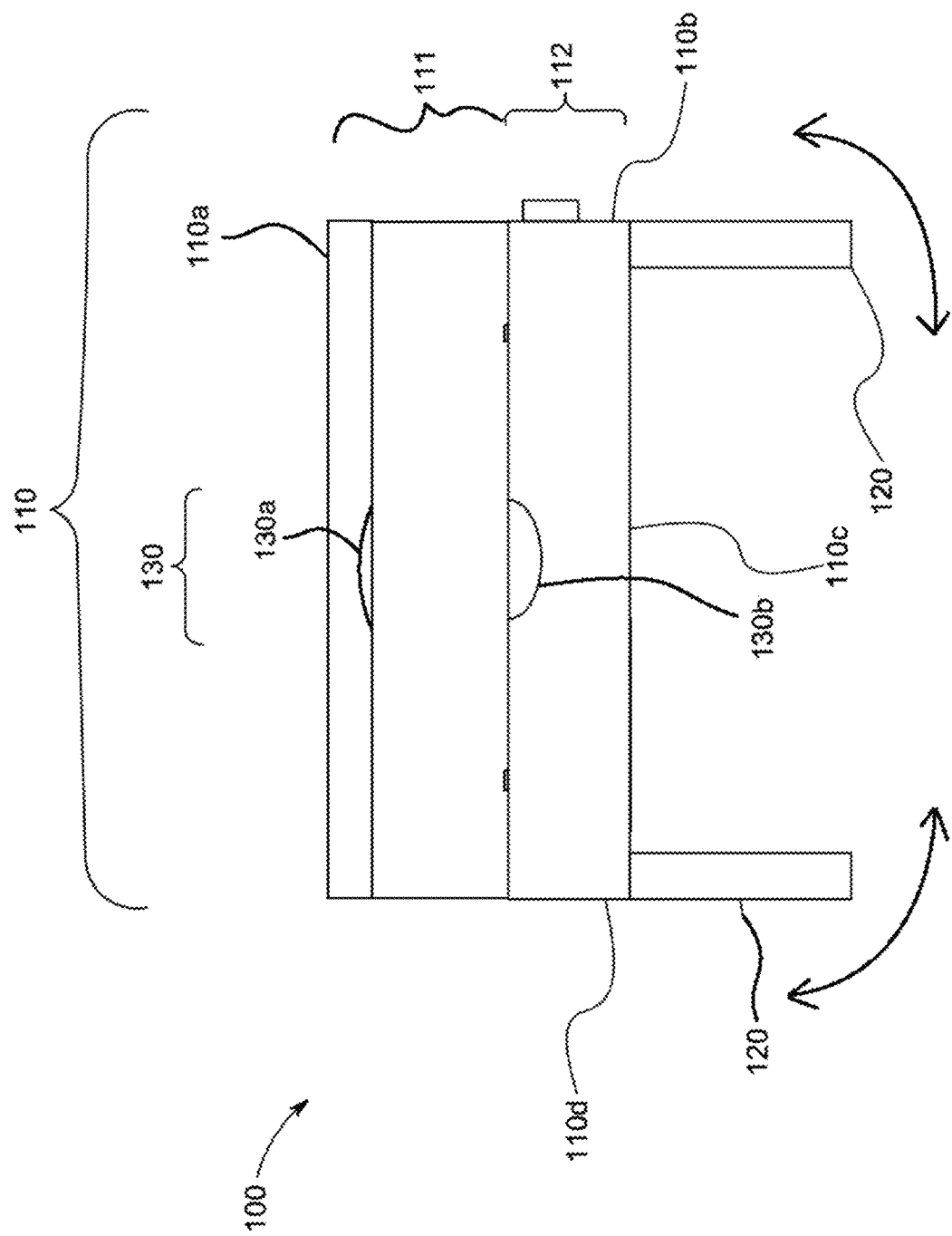
FIG. 1B illustrates a front view of the trunk cooler including the plurality of retractable legs in a retracted position and the top portion in a second position, according to an exemplary embodiment of the present general inventive concept.

FIG. 1B illustrates a front view of the trunk cooler 100 including the plurality of retractable legs 120 in a retracted position and the top portion in a second position, according to an exemplary embodiment of the present general inventive concept.

Figure 2:
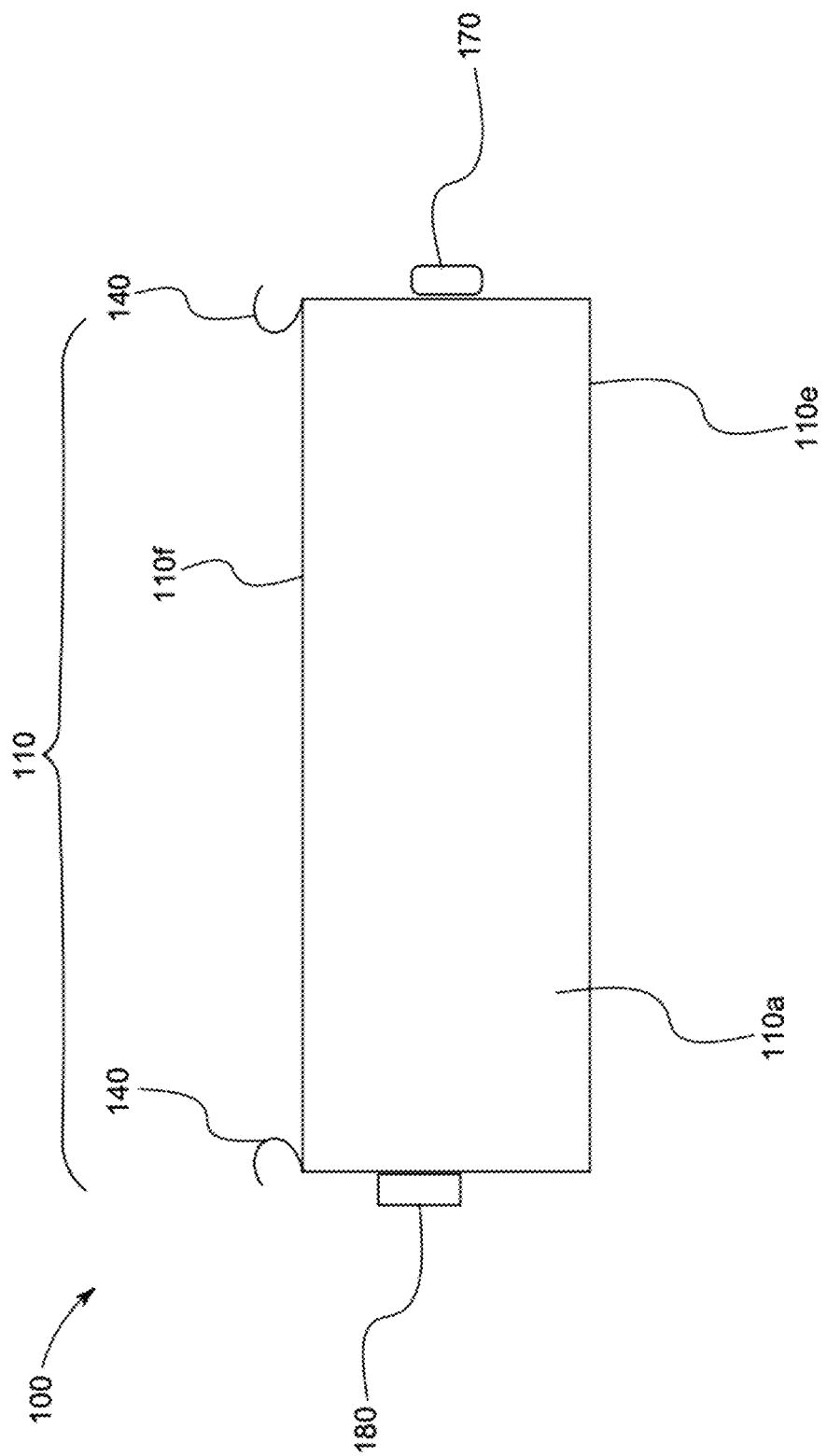
FIG. 2 illustrates a top view of the trunk cooler including a plurality of retractable hooks in an extended position, according to an exemplary embodiment of the present general inventive concept.

FIG. 2 illustrates a top view of the trunk cooler 100 including a plurality of retractable hooks 140 in an extended position, according to an exemplary embodiment of the present general inventive concept.

Figure 3:
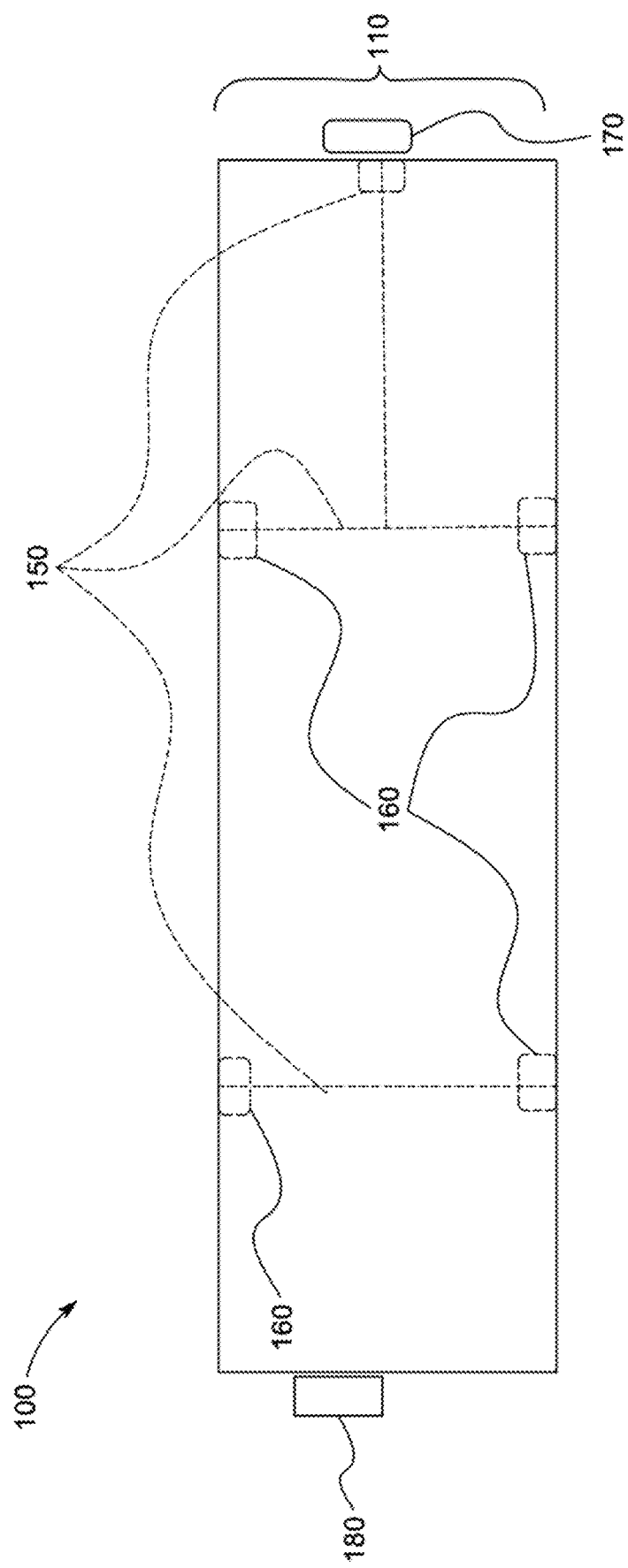
FIG. 3 illustrates a top view of the trunk cooler, according to an exemplary embodiment of the present general inventive concept.

FIG. 3 illustrates a top view of the trunk cooler 100, according to an exemplary embodiment of the present general inventive concept.

The trunk cooler 100 may be constructed from at least one of metal, plastic, wood, glass, rubber, polystyrene foam, etc., but is not limited thereto.

Referring to FIG. 1A, the trunk cooler 100 may be removably connected under a seat 10 of a vehicle.

Referring to FIGS. 1 through 3, the trunk cooler 100 may include a base cooler receptacle 110, a plurality of retractable legs 120, a clasp 130, a plurality of retractable hooks 140, a plurality of interior walls 150, a plurality of embedded grooves 160, a power inlet 170, and a cooling system 180, but is not limited thereto.

Referring to FIGS. 1 and 2, the base cooler receptacle 110 may include a first side 110a, a second side 110b, a third side 110c, a fourth side 110d, a fifth side 110e, a sixth side 110f, a top portion 111, and a bottom portion 112, but is not limited thereto.

Referring to FIGS. 1 through 3, the base cooler receptacle 110 is illustrated to have a rectangular prism shape. However, the base cooler receptacle 110 may be a square prism, a circular prism, a conical prism, a triangular prism, a pentagonal prism, a hexagonal prism, an octagonal prism, or any other shape known to one of ordinary skill in the art, but is not limited thereto.

The top portion 111 may be pivotally disposed on at least a portion of a top edge of the bottom portion 112 near the sixth side 110f. Alternatively, the top portion 111 may be pivotally disposed on at least a portion of a top edge of the bottom portion 112 near at least one of the second side 110b, the fourth side 110d, and the fifth side 110e. The top portion 111 may pivot in a first vertical direction or a second vertical direction from a first position (i.e. closed) to a second position (i.e. opened), such that the top portion 111 may move at least partially away from the bottom portion 112. As such, a user may place items within an interior portion of the base cooler receptacle 110 for storage. Specifically, the user may store an item, such as a food and/or a beverage within the bottom portion 112 of the base cooler receptacle 110. Moreover, the base cooler receptacle 110 may keep any contents at a cool temperature due to insulation materials along each side of the base cooler receptacle 110.

Alternatively, the top portion 111 may pivot in the second vertical direction or the first vertical direction from the second position to the first position, such that the top portion 111 may move at least partially toward the bottom portion 112. As such, the top portion 111 may cover the bottom portion 112 in the first position.

Referring to FIG. 1, at least one of the plurality of retractable legs 120 may be pivotally disposed on at least a portion of a bottom edge of the bottom portion 112 near the second side 110b. Additionally, another one of the plurality of retractable legs 120 may be pivotally disposed on at least a portion of the bottom edge of the bottom portion 112 near the fourth side 110d. Each of the plurality of retractable legs 120 may pivot in a first direction or a second direction from a first vertical position (i.e. retracted) to a second vertical position (i.e. extended), such that each of the plurality of retractable legs 120 may move at least partially away from the bottom portion 112. As such, the base cooler receptacle 110 may stand on the plurality of retractable legs 120. In other words, the plurality of retractable legs 120 may support the base cooler receptacle 110 in response to the plurality of retractable legs 120 being at least partially extended. Furthermore, the first side 110a may be used as a table while the top portion 111 is closed.

Alternatively, each of the plurality of retractable legs 120 may pivot in the second direction or the first direction from the second vertical position to the first vertical position, such that each of the plurality of retractable legs 120 may move at least partially toward the bottom portion 112. As such, the third side 110c of the base cooler receptacle 110 may be placed on a surface.

The clasp 130 may include a first section 130a and a second section 130b, but is not limited thereto. The clasp 130 may include a locking mechanism, such as a magnet, a button, a lever, a latch, at least one interlocking tooth, and/or any combination thereof, but is not limited thereto.

Referring to FIG. 1, the clasp 130 is illustrated to be disposed on a portion of the fifth side 110e. However, the clasp 130 may be disposed on at least a portion of the second side 110b, at least a portion of the fourth side 110d, or at least a portion of the sixth side 110f, such that the clasp 130 may be on an opposite side of the base cooler receptacle 110 with respect to a side that the top portion 111 pivots. Also, the clasp 130 may at least partially protrude from the fifth side 110e of the base cooler receptacle 110. Alternatively, the clasp 130 may be a partially recessed groove with respect to an outer surface of the base cooler receptacle 110. As such, the clasp 130 may facilitate gripping of the base cooler receptacle 110 by a user to open and/or close the top portion 111.

The first section 130a may be disposed on at least a portion of the bottom edge of the top portion 111. The second section 130b may be disposed on at least a portion of the top edge of the bottom portion 112. The first section 130a may lock in response to contact with the second section 130b. As such, the top portion 111 may not open without a substantial application of force from the user.

Referring to FIG. 2, each of the plurality of retractable hooks 140 are illustrated to be disposed on a portion of the sixth side 110f. However, each of the plurality of retractable hooks 140 may be disposed at any feasible portion of the outer surface of the base cooler receptacle 110, such as the first side 110a, the second side 110b, the third side 110c, the fourth side 110d, and the fifth side 110e.

Each of the plurality of retractable hooks 140 may be pivotally disposed on at least a portion of the sixth side 110f. Each of the plurality of retractable hooks 140 may pivot in a first direction or a second direction from a first position (i.e. retracted) to a second position (i.e. extended), such that each of the plurality of retractable hooks 140 may move at least partially away from the base cooler receptacle 110. As such, the base cooler receptacle 110 may be removably connected to a portion of the vehicle using the plurality of retractable hooks 140. As such, the trunk cooler 100 may be prevented from moving while the trunk cooler 100 is connected to the vehicle.

Alternatively, each of the plurality of retractable hooks 140 may pivot in the second direction or the first direction from the second position to the first position, such that each of the plurality of retractable hooks 140 may move at least partially toward the base cooler receptacle 110.

The trunk cooler 100 may additionally include the plurality of interior walls 150 to separate foods of different (or same) types, which are contained within the trunk cooler 100. Each of the plurality of interior walls 150 may be constructed to have a predetermined size, such that the user may adjust a configuration of the plurality of interior walls 150 within the base cooler receptacle 110. Additionally, each of the plurality of interior walls 150 may be inserted into the interior portion of the base cooler receptacle 110 using at least one of the plurality of embedded grooves 160 to create a plurality of compartments, such that any contents within each of the plurality of compartments may be prevented from mixing. In other words, the plurality of interior walls 150 may be removably connected to the interior portion of the base cooler receptacle 110. Moreover, the plurality of embedded grooves 160 may stabilize the plurality of interior walls 150, such that the plurality of interior walls 150 may be prevented from moving within the base cooler receptacle 110. The plurality of interior walls 150 may be arranged in any configuration desired by the user to maximize space within the base cooler receptacle 110.

The cooling system 180 may include at least one of a button, a knob, a lever, a touchscreen, sand a switch, but is not limited thereto. The user may manipulate the button to turn on or turn off the cooling system 180.

The power inlet 170 may be removably connected to a power source within the vehicle. Alternatively, the power inlet 170 may be removably connected to any conventional power source. The power inlet 170 may send power to the cooling system 180, such that the cooling system 180 injects cold air within the base cooler receptacle 110. As such, the cooling system 180 may be any type of refrigeration system known to one of ordinary skill in the art, which may include a condenser, a fan, a coolant/refrigerant, a coil system, etc.

In operation, the trunk cooler 100 may maximize the use of space that would be otherwise ignored to address the issue of transporting and using a cooler, on a frequent basis. The trunk cooler 100 may be comprised of a hard plastic and/or an aluminum cooler that is intended to fit under a back seat of a pickup truck. The trunk cooler 100 may be accessible by simply lifting the bench seat. The trunk cooler 100 may include the plurality of retractable hooks 140 to secure the trunk cooler 100 to the vehicle during transit. The trunk cooler 100 may be used outdoors as one would remove the trunk cooler 100 and then use the plurality of retractable legs 120 to showcase a small table that may uphold items removed from the trunk cooler 100 and/or serve as a primary eating station. When done, simply return the plurality of retractable legs 120 to their resting position and then place the trunk cooler 100 back in the truck and close the back seat. The trunk cooler 100 may prove to be an essential accessory for diverse consumers, specifically those who are avid hunters, fisherman, or beachgoers, as the trunk cooler may be added to the vehicle as a post-detail or included in the pickup model.

The trunk cooler 100 may fit under a seat 10 of the vehicle. This is often wasted space and would be a great accessory for hunters, fisherman, beachgoers, or even construction crews. Under the seat 10 of the vehicle there may be approximately 30 inches wide×24 inches deep×8 inches length (at the front down to approximately 5 inches at the back) of space under the seat 10. The bench seat may flip up to expose access to the trunk cooler 100 with easy access. The trunk cooler 100 may be a hard cased, very sturdy cooler made from hard plastic and/or possibly aluminum for durability. It may be available with potential upgrades, such as the power inlet 170 to receive a power supply in the vehicle to keep the trunk cooler 100 even cooler. Also, the trunk cooler 100 may plug into a conventional power outlet. There may be potential for having little slots in outer walls of the interior of the trunk cooler 100. The trunk cooler 100 may include the plurality of retractable hooks 140 to keep the trunk cooler 100 in place in the vehicle.

In one embodiment, the trunk cooler 100 may be a modern alternative to both transporting and utilizing a standard cooler.

In one embodiment, the trunk cooler 100 capitalizes on an area that is usually a wasted space by introducing a portable cooler adapted for storage underneath the back seat of a pickup truck.

In one embodiment, the trunk cooler 100 is designed to offer the feature of the plurality of embedded grooves 160 on the inside of the base cooler receptacle 110 that supports the insertion of the plurality of interior walls 150, permitting the user to make customizable sections for separating items they need cooled, such as individual food, medicine and/or other supplies.

The instant invention has been shown and described herein in what is considered to be the most practical and preferred embodiment. It is recognized, however, that departures may be made therefrom within the scope of the invention and that obvious modifications will occur to a person skilled in the art.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A trunk cooler removably connected under a seat of a vehicle, the trunk cooler comprising:
   a base cooler receptacle to store at least one item therein;
   a plurality of retractable legs pivotally disposed on at least a portion of a bottom edge of a bottom surface of the base cooler receptacle to support the base cooler receptacle in response to pivoting the plurality of retractable legs from being retracted in a first vertical position to at least partially extended in a second vertical position, such that the plurality of retractable legs pivot toward or away from the bottom edge of the bottom surface of the base cooler receptacle, such that the plurality of retractable legs remain on the bottom edge of the bottom surface of the base cooler receptacle while pivoting, such that the plurality of retractable legs contact the bottom edge and the bottom surface of the base cooler receptacle while the plurality of retractable legs are extended in the second vertical position, such that an outer edge of each of the plurality of retractable legs extended in the second vertical position is flush with a first side of the base cooler receptacle and a second side of the base cooler receptacle opposite with respect to the first side, such that the outer edge of each of the plurality of retractable legs extended in the second vertical position is flush with a first outer edge and a second outer edge of a portion of the base cooler receptacle that pivots from closed to open; and
   a cooling system to inject cold air into an interior portion of the base cooler.

2. The trunk cooler of claim 1, wherein the base cooler receptacle comprises:
   a bottom portion to store the at least one item therein; and
   a top portion pivotally disposed on a portion of a top edge of the bottom portion to cover the bottom portion in a first position and pivot to at least partially open in a second position.

3. The trunk cooler of claim 1, further comprising:
   a clasp disposed on a portion of an outer surface of the base cooler receptacle to facilitate gripping the base cooler receptacle.

4. The trunk cooler of claim 1, further comprising:
   a plurality of retractable hooks pivotally disposed on a portion of the base cooler receptacle to prevent the trunk cooler from moving while connected to the vehicle.

5. The trunk cooler of claim 1, further comprising:
   a plurality of interior walls removably connected to the interior portion of the base cooler receptacle to create a plurality of compartments, such that any contents within each of the plurality of compartments are prevented from mixing.

6. The trunk cooler of claim 5, further comprising:
   a plurality of embedded grooves disposed within the interior portion to stabilize the plurality of interior walls therein, such that the plurality of interior walls are prevented from moving within the base cooler receptacle.

7. A trunk cooler removably connected under a seat of a vehicle, the trunk cooler comprising:
   a base cooler receptacle, comprising:
      a bottom portion to store the at least one item therein, and
      a top portion pivotally disposed on a portion of a top edge of the bottom portion to cover the bottom portion in a first position and pivot to at least partially open in a second position;
   an oval-shaped clasp disposed on a portion of an outer surface of the base cooler receptacle and recessed with respect to the outer surface to facilitate gripping the base cooler receptacle, the oval-shaped clasp comprising:
      a first section disposed on at least a portion of a bottom edge of the top portion, and
      a second section disposed on at least a portion of the top edge of the bottom portion;
   a plurality of retractable legs pivotally disposed on at least a portion of a bottom edge of a bottom surface of the base cooler receptacle to support the base cooler receptacle in response to pivoting the plurality of retractable legs from being retracted in a first vertical position to at least partially extended in a second vertical position, such that the plurality of retractable legs remain on the bottom edge of the bottom surface of the base cooler receptacle while pivoting, such that the plurality of retractable legs contact the bottom edge and the bottom surface of the base cooler receptacle while the plurality of retractable legs are extended in the second vertical position, such that an outer edge of each of the plurality of retractable legs extended in the second vertical position is flush with a first side of the base cooler receptacle and a second side of the base cooler receptacle opposite with respect to the first side, such that the outer edge of each of the plurality of retractable legs extended in the second vertical position is flush with a first outer edge and a second outer edge of a portion of the base cooler receptacle that pivots from closed to open; and
   a cooling system to inject cold air into an interior portion of the base cooler.

* * * * *